No. 858,607. PATENTED JULY 2, 1907.
A. KRAUTZBERGER.
DUST COLLECTOR.
APPLICATION FILED FEB. 23, 1906.

2 SHEETS—SHEET 1.

WITNESSES
W. P. Burke
D. J. Callaghan

INVENTOR
Albert Krautzberger
By Richards
ATTYS.

No. 858,607. PATENTED JULY 2, 1907.
A. KRAUTZBERGER.
DUST COLLECTOR.
APPLICATION FILED FEB. 23, 1906.

2 SHEETS—SHEET 2.

UNITED STATES PATENT OFFICE.

ALBERT KRAUTZBERGER, OF HOLZHAUSEN, NEAR LEIPZIG, GERMANY.

DUST-COLLECTOR.

No. 858,607.

Specification of Letters Patent.

Patented July 2, 1907.

Application filed February 23, 1906. Serial No. 302,655.

*To all whom it may concern:*

Be it known that I, ALBERT KRAUTZBERGER, manufacturer, residing at Holzhausen, near Leipzig, in the Kingdom of Saxony, in the German Empire, a subject of the Austrian Emperor, have invented certain new and useful Improvements in Dust-Collectors, of which the following is a full, clear, and exact specification, and for which I have applied for a patent in Germany, under K. 29098 III/50e, on the 6th of March, 1905; further I have received a patent in England, No. 5558/1905, the date of application being the 6th of March, 1905; and further I have applied for a patent in France on the 3d of November, 1905.

My invention relates to and has for its object an apparatus for separating dust from currents of air or other gases and particularly to apparatus for recovering the waste products in the ceramic industry wherein colors often of considerable value are sprayed on to the articles manufactured.
When working with dust collectors of the type in which perforated plates are arranged in a box or case, various requirements must be complied with in order to obtain efficient working. For example it is necessary to so set in the perforated plates that they are not vertical but horizontal. Further it is advisable to arrange scrapers so that when the plates are withdrawn the dust attaching thereto is not drawn out with them, but is removed by the said scrapers and falls inside the apparatus. While by the vertical position of the perforated plates the dust falls to the bottom of the case of the apparatus and consequently cannot be very easily collected together, by the horizontal arrangement of the plates there is the advantage that the dust scraped off all collects on the lowest plate after the upper plates have been removed one after the other. The last plate may be unperforated so that the dust cannot fall through and is collected on it. It is further advisable that the case in which the plates are fitted should be transparent, for example made of glass, so that one can perceive at a glance if the plates ought to be changed.

Figures 1, 2:
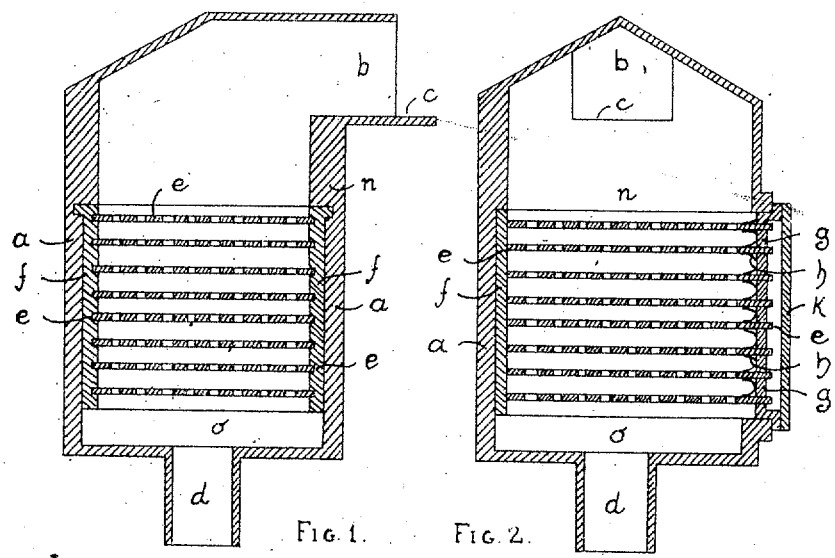
Figures 3, 4:
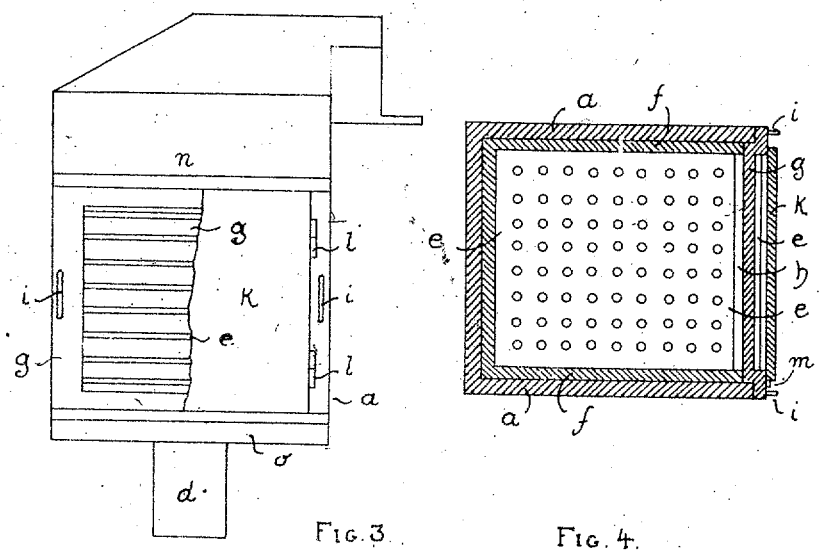
Figure 5:
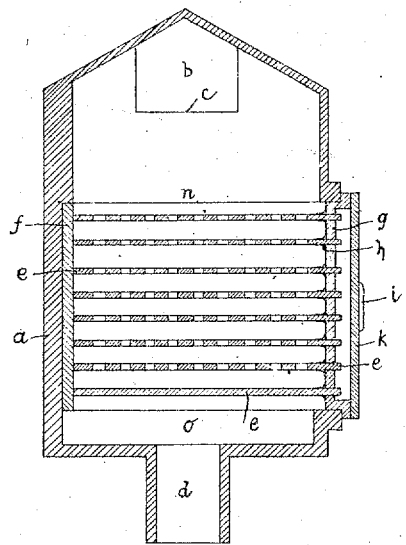

The accompanying drawings illustrate one form of an apparatus embodying my invention wherein:

Figure 1. is a vertical section as seen from the side from which the plates are withdrawn. Fig. 2. is a vertical section from the side at right angles to that from which the plates are drawn out. Fig. 3. is an outside elevation showing one of the two lids, hereinafter referred to, partially removed. Fig. 4. is a horizontal section. Fig. 5 is a sectional view of a modification.
Similar letters of reference refer to similar parts in all views.

In the example illustrated *a* is the case or box proper, *b* is the working opening preferably having a small board or platform *c*, on which the work causing the dust can be placed, or it can be connected to the source of dust in any suitable manner. At the bottom of the case *a*, a pipe *d* is arranged and connected with an exhauster or other device for withdrawing the air. The perforated plates *e* are arranged in the case *a* in a fitting *f* so that they can be withdrawn from the fitting separately as will be seen from the drawing the fitting *f* is in the form of a bottomless drawer. The whole fitting *f* with all the plates can also be bodily withdrawn. The fitting is closed on one side by a lid or cover *g* which contains a division for each plate. Further the cover *g* has scrapers *h* fitted to it. These preferably consist of strips of sheet steel which press against the plates and when the latter are withdrawn from the case they remove any dust clinging to them. The lid *g* can be fitted to the case *f* in any suitable way, such as by hooks or the like.

It proves specially suitable for the purpose to make the perforated plates *e* of aluminium. In this case if the plates in being scraped should suffer slight damage or deterioration and thereby parts of the plates come by chance into the collected dust, even then these parts can do absolutely no damage. While bits of iron or other material produce a discoloration in the burning of the colors, as they have colored combinations, this is not the case with the presence of particles of aluminium, since aluminium is a metal, the combinations with which are colorless.

When the apparatus is working, the fitting *f* is put into the apparatus. The air laden with dust as it passes through the apparatus deposits its dust on the plates *e* and so it is very easy when the plates are full to withdraw them one by one until all the dust is collected on the last plate, or the whole fitting *f* with all the plates can be withdrawn at once, so that a fresh fitting *f* with other plates can be substituted in a moment. This operation is very simple owing to the handles *i* fitted to the lid *g*. The possibility of changing all the plates constitutes an important advantage of the present invention, and of especial importance for a case for instance, when the apparatus is used in the ceramic industry where, when paint is sprayed by an air sprayer, it is often necessary to change the colors and it is often absolutely necessary to keep the colors, some of which are very valuable, separate. Up to the present it has been necessary to have a separate apparatus for each color. This was however only possible in large undertakings and occasioned a great loss of time.

In order to obtain a complete closing of the apparatus, a second cover *k* is provided, which can be fastened to the projecting edge of the inner cover *g* by a hinge *l* and hooks *m*. If it is intended to withdraw individual plates from the apparatus, the cover *k* is opened and the separate plates removed. If however it is desired to change all the plates at once, the cover *k* is not removed, but the whole can be withdrawn by the handles *i*.

As already mentioned, the rapidity and security is considerably increased by making the case of glass. Naturally in this case the fitting $f$ must also be made of glass or, as already referred to, consist of only a set of divisions or grooves which serve as guides for the plates $e$, or when the cover serves as a support for the plates, it can be entirely dispensed with.

The advantages of the present invention other than those already referred to, consist in the exceptionally rapid and sure working of the apparatus; especially the vertical position of the apparatus is of great advantage. The current of air is distributed more effectively on the transverse section of the apparatus than when the air current has a horizontal direction. The use of special distributers and ventilators, as is usual with such apparatus for distributing the air current over the whole surface, can be dispensed with. This vertical arrangement also takes up much less space, as the apparatus whatever the number of plates used has only the same cross section.

Without limiting myself to the exact construction and arrangement of parts herein shown and described, what I claim and desire to secure by Letters Patent is:—

1. A dust collector of the type described, comprising in combination a casing, having an air-inlet opening at its upper end, a bottomless drawer with a plurality of horizontal grooves on its side walls and a plurality of corresponding slot like openings in its front wall, a plurality of separately removable perforated horizontal plates engaging in said grooves and adapted to be withdrawn through said slot like openings, strips of sheet steel attached to said front walls with their free edges in contact with the plates and adapted to scrape said plates during their removal, and a detachable cover adapted to cover hermetically the exterior of said front wall.

2. A dust collector of the type described, comprising in combination a casing, having an air inlet opening at its upper end and an air outlet opening at its lower end, a bottomless drawer with a plurality of horizontal grooves on its side walls and a plurality of corresponding slot like openings in its front wall, a plurality of separately removable perforated horizontal plates and one lowermost imperforate horizontal plate engaging in said grooves and adapted to be withdrawn through said slot like openings, strips of sheet steel attached to said front walls with their free edges in contact with the plates and adapted to scrape said plates during their removal, and a detachable cover adapted to cover hermetically the exterior of said front wall.

3. A dust collector of the type described, comprising in combination a casing, having an air inlet opening at its upper end and an air outlet opening at its lower end, a bottomless drawer with a plurality of horizontal grooves on its side walls and a plurality of corresponding slot like openings in its front wall, a plurality of separately removable perforated horizontal aluminium plates engaging in said grooves and adapted to be withdrawn through said slot like openings, strips of sheet steel attached to said front walls with their free edges in contact with the aluminium plates and adapted to scrape said aluminium plates during their removal, and a detachable cover adapted to cover hermetically the exterior of said front wall.

4. A dust collector of the type described comprising in combination a casing, having an air inlet opening at its upper end and an air outlet at its lower end, a bottomless drawer with a plurality of horizontal grooves on its side walls and a plurality of corresponding slot like openings in its front wall, a plurality of separately removable perforated horizontal aluminium plates and one lowermost imperforated horizontal aluminium plate engaging in said grooves and adapted to be withdrawn through said slot like openings, strips of sheet steel attached to said front walls with their free edges in contact with the aluminium plates and adapted to scrape said aluminium plates during their removal, and a detachable cover adapted to cover hermetically the exterior of said front wall.

In witness whereof I have hereunto set my hand in presence of two witnesses.

ALBERT KRAUTZBERGER.

Witnesses:
RUDOLPH FRICKE,
SOUTHARD P. WARNER.